(12) United States Patent
Donlin et al.

(10) Patent No.: US 7,788,502 B1
(45) Date of Patent: Aug. 31, 2010

(54) METHOD AND SYSTEM FOR SECURE EXCHANGE OF IP CORES

(75) Inventors: Adam P. Donlin, Los Gatos, CA (US); Prasanna Sundararajan, Mountain View, CA (US); Bernard J. New, Carmel Valley, CA (US)

(73) Assignee: Xilinx, Inc., San Jose, CA (US)

( * ) Notice: Subject to any disclaimer, the term of this patent is extended or adjusted under 35 U.S.C. 154(b) by 1314 days.

(21) Appl. No.: 11/076,656

(22) Filed: Mar. 10, 2005

(51) Int. Cl.
*G06F 11/30* (2006.01)
(52) U.S. Cl. ...................................... 713/189; 380/255
(58) Field of Classification Search .................. 726/26; 713/189, 193; 380/30
See application file for complete search history.

(56) References Cited

U.S. PATENT DOCUMENTS

| | | | |
|---|---|---|---|
| 5,457,408 A | 10/1995 | Leung | |
| 5,768,372 A | 6/1998 | Sung et al. | |
| 5,915,017 A | 6/1999 | Sung et al. | |
| 5,978,476 A | 11/1999 | Redman et al. | |
| 6,212,639 B1 * | 4/2001 | Erickson et al. | 726/26 |
| 6,356,637 B1 | 3/2002 | Garnett | |
| 6,366,117 B1 | 4/2002 | Pang et al. | |
| 6,401,208 B2 | 6/2002 | Davis et al. | |
| 6,441,641 B1 | 8/2002 | Pang et al. | |
| 6,510,548 B1 * | 1/2003 | Squires | 716/16 |
| 6,654,889 B1 | 11/2003 | Trimberger | |
| 6,748,368 B1 | 6/2004 | Trimberger et al. | |
| 6,931,543 B1 | 8/2005 | Pang et al. | |
| 6,957,340 B1 | 10/2005 | Pang et al. | |
| 6,965,675 B1 | 11/2005 | Trimberger et al. | |
| 6,981,153 B1 | 12/2005 | Pang et al. | |
| 6,996,713 B1 | 2/2006 | Trimberger | |
| 7,058,177 B1 | 6/2006 | Trimberger et al. | |
| 7,107,567 B1 * | 9/2006 | LeBlanc | 716/17 |
| 7,117,372 B1 | 10/2006 | Trimberger et al. | |
| 7,117,373 B1 | 10/2006 | Trimberger et al. | |
| 7,134,025 B1 | 11/2006 | Trimberger | |
| 7,162,644 B1 | 1/2007 | Trimberger | |
| 7,165,229 B1 * | 1/2007 | Gathoo et al. | 716/1 |
| 7,200,235 B1 | 4/2007 | Trimberger | |
| 7,219,237 B1 | 5/2007 | Trimberger | |
| 7,240,218 B2 | 7/2007 | Kean | |
| 7,366,306 B1 | 4/2008 | Trimberger | |
| 7,373,668 B1 | 5/2008 | Trimberger | |
| 7,389,429 B1 | 6/2008 | Trimberger | |

(Continued)

FOREIGN PATENT DOCUMENTS

WO    WO 01/08411 A1    2/2001

OTHER PUBLICATIONS

U.S. Appl. No. 10/929,078, filed Aug. 27, 2004, Simkins.

(Continued)

*Primary Examiner*—Jung Kim
*Assistant Examiner*—Samson B Lemma
(74) *Attorney, Agent, or Firm*—Samuel G. Campbell; John J. King

(57) ABSTRACT

A method and system are disclosed. The system includes a trusted loader. The method includes downloading an IP core from a vendor to a target device. The IP core is received in an encrypted form at the target device, which can be, for example, a programmable logic device.

20 Claims, 12 Drawing Sheets

U.S. PATENT DOCUMENTS

| | | | |
|---|---|---|---|
| 7,653,820 | B1 | 1/2010 | Trimberger |
| 2001/0037458 | A1 | 11/2001 | Kean |
| 2002/0150252 | A1 | 10/2002 | Wong |
| 2002/0199110 | A1* | 12/2002 | Kean .......................... 713/189 |

OTHER PUBLICATIONS

Schneier, Bruce, "Applied Cryptography, 2*nd* Edition," published by John Wiley & Sons, 1996, pp. 32-37, 111 River St., Hoboken, New Jersey, USA.

Delpasso, Marcello et al., "Hardware/Software IP protection," *Proceedings of the 37th Annual Conference on Design Automation (DAC'00)*, Jun. 5-9, 2000, pp. 593-596, Los Angeles, California, USA.

Actel Corp., "Protecting your Intellectual Property from the Pirates," presentation at DesignCon '98, Jan. 26, 1998, 18 pp, Santa Clara, California, USA.

Wikipedia, "Programmable logic device," article downloaded from http://en.wikipedia.org on Jul. 25, 2008, article edit date Aug. 15, 2004, 6 pp.

National Institute of Standards and Technology, Digital Signal Standards (DSS), *Federal Information Processing Standards Publication (FIPS)* 186-2, Jan. 27, 2000, pp. 1-74, available from the U.S. Department of Commerce, National Institute of Standards and Technology (NIST), 100 Bureau Drive, Stop 8900, Gaithersburg, Maryland, USA.

U.S. Appl. No. 11/077,052, filed Mar. 10, 2005, Donlin et al.

U.S. Appl. No. 10/147,664, filed May 17, 2002, Trimberger.

U.S. Appl. No. 10/150,289, filed May 17, 2002, Trimberger.

Patavalis, Nick, *A Brief Introduction to the JTAG Boundary Scan Interface*, Nov. 8, 2001, pp. 1-7, http://www.inaccessnetworks.com/projects/ianjtag/jtag-intro/jtag-intro.html, inAccess Networks, Athens, Greece.

Altera Corp., "Evaluating AMPP & MegaCore Functions," Application Note 125, Apr. 2001, Ver. 2.0, pp. 1-9, available from Altera Corporation, San Jose, California, USA.

Kean, Tom, "Cryptographic Rights Management of FPGA Intellectual Property Cores" *Proc. of the 2002 ACM/SIGDA 10th International Symposium on Field Programmable Gate Arrays*, Feb. 24, 2002, pp. 113-118, ACM, New York, New York, USA.

XESS Corp., *XSTOOLSs V4.0 User Manual*, Oct. 29, 2001, 18 pages, available from XESS Corporation, Apex, North Carolina, USA.

\* cited by examiner

METHOD AND SYSTEM FOR SECURE EXCHANGE OF IP CORES

BACKGROUND OF THE INVENTION

1. Field of the Invention

This invention relates to the field of programmable logic devices, and more particularly relates to a method and system for the secure exchange of IP cores.

2. Description of the Related Art

Intellectual Property (IP) cores are sub-elements of a design that represent separate functions that can be included in overall designs to provide such functionality. IP cores for programmable logic devices (PLDs), such as field-programmable gate arrays (FPGAs), are increasingly complex and correspondingly expensive to develop and verify. Because creating IP cores requires such a significant investment, IP core vendors require a secure mechanism to control the distribution and delivery of such IP cores. Encryption is the primary tool used to provide secure delivery of an IP core to a deployed system. Traditionally, a secret encryption key is known to the IP vendor in advance of providing the IP core. The secret key is used to encrypt the configuration bitstream that implements the IP core. Special key registers within the FPGA are programmed with the vendor's secret key. When the FPGA powers up a hardware decryption engine, the key register data is used to decrypt the encrypted IP core into a standard FPGA bitstream. This bitstream is generated within the FPGA and configures the FPGA's resources (e.g., look-up tables (LUTs), routing resources, and the like). There are a number of limitations to such a mechanism. Among such limitations:

There are typically a limited number of key registers in a given PLD. Since all of the vendor keys need to be programmed in advance in such an architecture, "worst case" key storage must be designed into the device;

The vendor must expose their secret key to the EDA tools of their customer, at a minimum. The EDA tool is perceived as a trusted agent that only generates an encrypted bitstream.

Another limitation concerns the delivery path of the vendor's secret key to the deployed PLD. Presently, there is no entity existing that can program the key registers (e.g., in an FPGA in a design). Providing such an entity would be invasive because such an entity must be present in the manufacturing process and must not be observable while sending the vendor keys to the FPGA. It is conceivable that unscrupulous board vendors could monitor for the key as the key is communicated to the PLD. Loss of key data remains an inconvenience, but this can be mitigated using battery-backed storage and capacitors that address short term power loss to a deployed system. In the event of a vendor key being compromised, however, revoking existing keys and replacing them with a new secure key is so expensive as to be prohibitive. The situation is similar for non-volatile key storage—the vendor lacks an elegant mechanism to revoke the keys from a deployed PLD. Once again, there must be enough key storage for each possible vendor.

Moreover, IP vendors and other sources of design information currently tend to focus their development efforts on designs for the application-specific integrated circuit (ASIC) market. This is due, in large part, to the simple, reliable methods that are presently available to securely provide IP cores in such applications.

Thus, IP vendors are often reluctant to tailor their IP cores for use in PLDs because current methods for downloading the requisite IP core are less than robust. As a result, IP vendors lack the motivation necessary to optimize their designs for a given PLD architecture. ASIC-centric IP cores therefore typically perform poorly in a PLD, which further reinforces the need for designers and manufacturers to migrate to an ASIC-based approach quickly after initial prototype testing using PLDs.

The net result of the foregoing limitations is that the bitstream encryption facilities of currently available PLDs are only used by an end customer to protect their final application bitstream. Vendors of IP used within the customer's design are effectively frozen out of encrypting their IP independently of the customer application.

What is therefore desired is a technique that provides a method for third-party IP cores to be delivered securely for use in a PLD such as an FPGA. Such a technique should prevent access to/use of the subject IP core(s) by unauthorized parties. Such a secure method should also allow different IP vendors to safely deliver encrypted IP to a PLD. Furthermore, it is desirable to achieve this goal without requiring a device to be programmed with each of the required vendor keys in advance of deployment. An IP vendor should be free to define and revoke keys used to encrypt their IP, because such keys could only transmitted to the target device when required. The framework responsible for the encryption and delivery of that IP should prevent the vendor keys being exposed to either the customer or other IP vendors used in the customer's design. Moreover, such a technique should provide IP vendors an incentive to optimize for a given PLD architecture by providing the foregoing features in a transparent, controllable, and economic mechanism.

SUMMARY

Embodiments of the present invention address the foregoing needs by providing a mechanism that facilitates the provision of IP cores to an entity configuring (i.e., programming) a PLD (or even directly to the PLD itself), in a manner that does not permit access to the IP core's design information. Only the PLD receiving the IP core is able to access the IP core's design information, and so program the IP core into the PLD. By making the IP core available only within the PLD itself, other entities (manufacturers, end-users and the like) are denied access to the IP core's design, and so prevented from co-opting the design for their own purposes.

In one embodiment, a system is disclosed. The system includes a trusted loader. In another embodiment, a method is disclosed. The method includes downloading an IP core from a vendor to a target device via a communications network, for example, an intra-network or internet or a combination thereof.

In yet another embodiment, a method is disclosed. The method includes creating a skeleton design. In still another embodiment, a method is disclosed. The method includes receiving an encrypted IP core at a programmable logic device.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
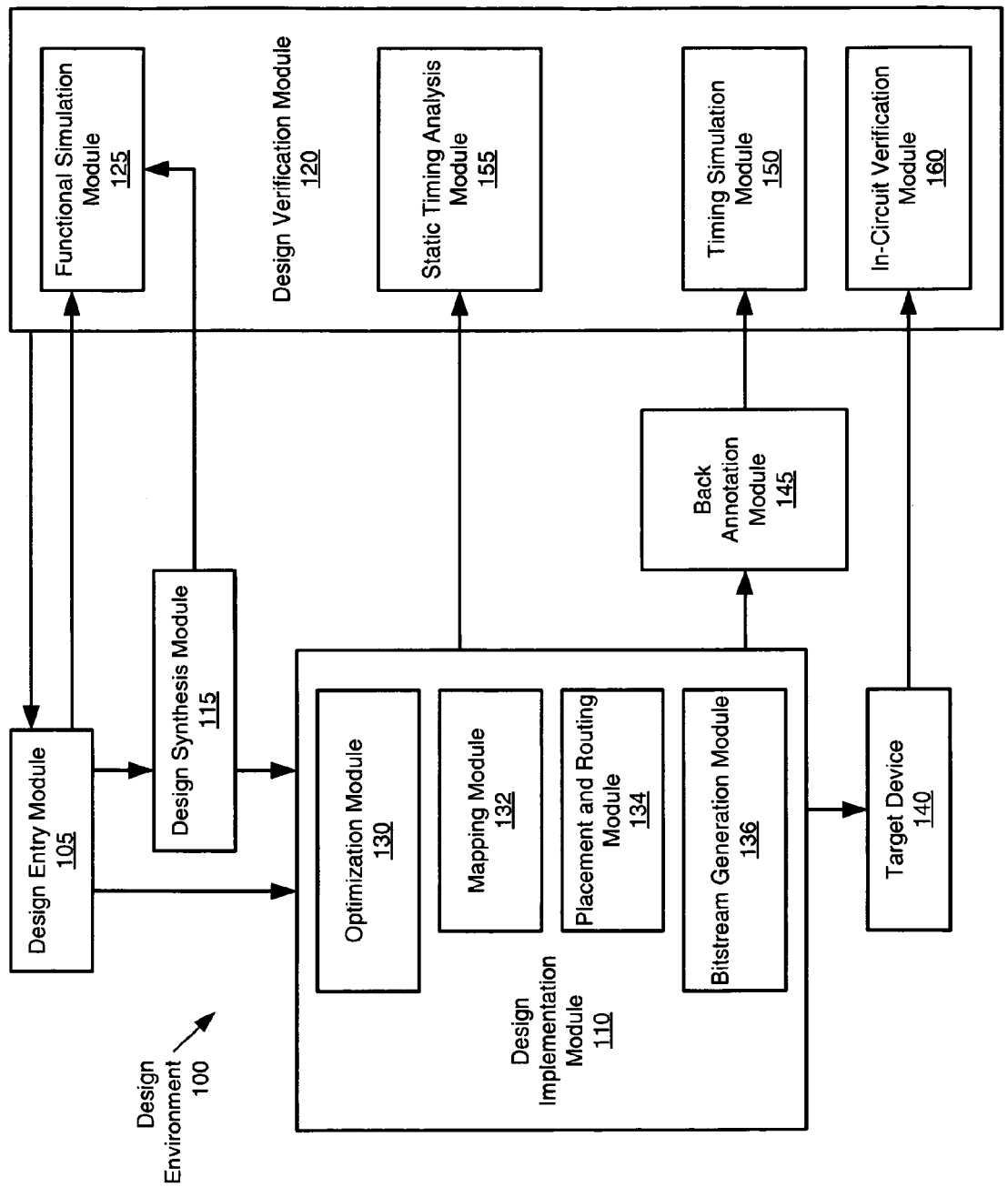
FIG. 1 is a block diagram illustrating a design flow for a programmable logic device.

The following is intended to provide a detailed description of an example of the invention and should not be taken to be limiting of the invention itself. Rather, any number of variations may fall within the scope of the invention which is defined in the claims following the description.

INTRODUCTION

Embodiments of the present invention provides a mechanism that facilitates the provision of IP cores to an entity configuring (i.e., programming) a PLD (or even directly to the PLD itself), in a manner that does not permit access to the IP core's design information. Only the PLD receiving the IP core is able to access the IP core's design information, and so program the IP core into the PLD. By making the IP core available only within the PLD itself, other entities (manufacturers, end-users and the like) are denied access to the IP core's design, and so prevented from co-opting the design for their own purposes.

In one embodiment, this protection is provided through the use of a public/private key encryption technique. For such techniques, a pair of keys are created (e.g., "Key-A" and "Key-B"). Any message encrypted using Key-A (the "public" key) can only be decrypted with Key-B (the "private" key). The IP vendor encrypts the IP core using the recipient PLD's public key. The PLD receiving the encrypted IP core then decrypts the encrypted IP core using the PLD's private key. The PLD is then able to program the unencrypted IP core into the PLD's fabric.

Using an embodiment of the present invention, an IP vendor is free to send an encrypted IP core to designers, manufacturers, end-users and other such parties, without concern for the IP core being subjected to reverse engineering or the like. Parties such as these are unable to gain access to the IP core's design because the private key of the public/private key pair is maintained inside the PLD (individually, by PLD family or in some other fashion). Design tools implementing an embodiment of the present invention do not receive such design details, and block users from "seeing" inside the PLD design (configuration bitstream) associated with the IP core. The IP core's design thus remains protected, even from those who have purchased its use.

Moreover, a solution according to an embodiment of the present invention offers greater flexibility than simply programming all vendor keys into a given PLD. A secure exchange framework of an embodiment of the present invention requires only minor changes to the organization of current PLD configuration mechanisms in order to support such an approach. The framework assumes the device has access to a communications channel at some point during its programming or use, and is therefore able to receive the vendor-encrypted IP core(s) via that communications channel. For example, such a PLD might have access to an ethernet-type network by which the device can reach the Internet. Also, a small amount of non-volatile key storage within the PLD (e.g., for the storage of one or two sets of keys) is assumed.

Three main roles exist in a secure exchange framework of an embodiment of the present invention: the customer (or user), the IP vendor(s), and a trusted framework agent. This trusted framework agent can even be the PLD's manufacturer. Customers negotiate in advance with each IP vendor for the use of one or more of the vendor's IP cores in the customer's application design. The customer may receive time restricted (or otherwise restricted) versions of the vendor's IP core(s) to prototype a design (e.g., only a functional model of the IP core).

The trusted framework agent is responsible for programming key data into PLDs before the PLDs reach the customer, who then includes the PLDs in a design. When the customer's design is deployed, the configuration bitstream is left incomplete, as the customer does not have a full version of the IP core(s). This incomplete configuration bitstream is referred to herein as a skeleton design. In a secure exchange framework of an embodiment of the present invention, the complete system is only ever fully assembled within the target FPGA. An example of an approximate sequence of events that occur when creating the fully operational application within a PLD is:

In one embodiment, a trusted loader subsystem, certified by the trusted framework agent, is configured into the target device and takes control of a network connection. The trusted loader's logic can acquire, on request, encrypted configuration bitstreams of IP cores used in a design and configure them into the logic of the PLD. The trusted loader can be implemented in silicon or using PLD logic resources. The trusted loader gathers information regarding the structure of the design by loading the design's configuration bitstream from a configuration source. An alternative is for the PLD to broadcast its identity to some other network service in order to discover which application structure should be built.

The incomplete configuration bitstream is then configured into the remaining area of the target. This configuration can be handled by the trusted loader in a number of arrays, as discussed subsequently. Since the application is incomplete, there are "gaps" in the configured logic that are to be filled by the IP core(s). These gaps may be actual gaps in the configured design, or merely conceptual in nature.

Encrypted configuration bitstreams for each IP core are acquired in turn. Each is decrypted and configured into an area of the design. The trusted loader can determine the location in which to place each decrypted configuration bitstream from the application structure information received from the configuration source (e.g., configuration storage unit or network). As will be appreciated, the IP vendor should be prevented from overwriting or snooping into other parts of the PLD's configuration. The trusted loader enforces access control according to the application design's structural data. This prevents one IP vendor from compromising IP cores from another IP vendor by partially overwriting the other vendor's configuration bitstream. Since the customer's design is loaded first, the customer's design is also limited in its ability to compromise the configuration bitstreams of any vendor's IP core. Design rules evident in the IP core's configuration bitstream and enforced by the vendor's EDA flow can protect the IP core(s) from any such attempted access. The trusted behavior of the trusted loader ensures such measures are configured completely. Moreover, vendors can also provide encrypted configuration bitstreams for loading into the application structure in a manner that physically locks these configuration bitstreams into a position defined in the final design.

Embodiments of the present invention thus provides a number of advantages. An embodiment of the present invention provides efficient, convenient and architecture-independent techniques for securely providing IP cores to a PLD, to a device employing the PLD, to the entity programming the PLD or to others having need of the IP core. With regard to securing an IP core, public/private key encryption can be employed. In such a scenario, an IP core is encrypted with a public key by the IP vendor. The public key corresponds (in some manner) to the PLD requesting the IP core. A PLD implementing an embodiment of the present invention includes a trusted loader that is capable of decrypting the encrypted IP core with the PLD's private key. The trusted loader can be designed-in, downloaded from a configuration storage unit (either as part of a design or separately), downloaded from a remote source (e.g., a trusted framework agent) or downloaded from some other source. These advantages and others will be better understood in light of the following discussions.

An Example Design Environment

FIG. 1 is block diagram of a design environment 100 that is capable of employing an embodiment of the present invention. Design environment 100 includes a design entry module 105, which allows a designer to enter a design into design environment 100. A design entered using design entry module 105 is then taken as input by a design implementation module 110.

Additionally, one or more portions of the design entered using design entry module 105 can be synthesized using a design synthesis module 115. Once synthesized, these portions can be provided to a design verification module 120, and in particular, a functional simulation module 125, thereof. The synthesized portions of the design generated by design synthesis module 115 are also provided to design implementation module 110. Typically, this occurs after the synthesized portions of the design have been simulated using functional simulation module 125. Other portions of the design entered via design entry module 105 are also provided to functional simulation module 125 of design verification module 120. By providing the design to functional simulation module 125 (both the portions entered by the designer using design entry module 105, and the portions of that design synthesized by design synthesis module 115), a complete functional simulation of the design can be performed.

Once the design (both designer-entered and synthesized portions of the design) have been provided to design implementation module 110, a number of processes are then performed on the design in order to prepare the design for being programmed into a target device. Among these are optimization (performed by optimization module 130), mapping (performed by a mapping module 132), placement and routing (performed by a placement and routing module 134), and bitstream generation (performed by a bitstream generation module 136).

The optimization performed by optimization module 130 can include, for example, two-level and multi-level optimization, as well as device-specific logic packing. The objective of such optimization is to decrease the area required by the combinational logic, to reduce the number of logic levels, or both. The mapping performed by mapping module 132 maps the components of the design into elements that exist within the target device in which the design is to be implemented.

Once optimization and mapping (via the selection of elements within the target device) have been performed, placement of the identified elements within the target device is performed by placement and routing module 134, as is the routing of connections between those elements. The placement operations performed can be equated to the selection of which elements within the target device will be used to perform a given function. Once the requisite elements of the target device are identified and placed, and the routing of connections between these elements has been determined, a bitstream can be generated. This bitstream represents the programming of the target device that is needed to provide such elements and connections. Such a bitstream is generated by bitstream generation module 136. This bitstream is then downloaded by design implementation module 110 to the target device (represented in FIG. 1 as a target device 140).

Design implementation module 110 also can provide for back annotation by providing place and route information to a back annotation module 145, which in turn provides information regarding the design to a timing simulation module 150. Design implementation module 110 can also provide information to a static timing analysis module 155. By allowing the performance of static timing analysis (via static timing analysis module 155) and dynamic timing analysis (provided by timing simulation module 150), as well as information regarding the design generated by functional simulation module 125, design verification module 120 is able to feedback information to design entry module 105 in order to allow defects in the design to be corrected.

This process of implementing a design using design implementation module 110 and feedback to design verification module 120 also allows a design to be optimized in an iterative manner. Once a design has been optimized in this manner, the design can then be downloaded to target device 140, as noted. Once downloaded to target device 140, in-circuit verification can be performed using an in-circuit verification 160 of design verification module 120. As before, the information generated by in-circuit verification module 160 can be fed back from design verification module 120 to design entry module 105, in order to optimize the design.

Regarding the signals and communications described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of FPGA 100). It is to be understood that such depicted architectures are merely examples, and that in fact many other architectures can be implemented that achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "[operably] connected", or "[operably] coupled", to each other to achieve the desired functionality.

Using a design environment of an embodiment of the present invention, such as that described in connection with FIG. 1, the customer leaves pre-defined "gaps" in the design structure when creating a design, as noted earlier. These gaps, which may be actual or conceptual, reserve space for each instance of an IP core used in the design. Alternatively, a placeholder for the given IP core can be inserted into the design structure, reserving space for the actual IP core using dummy information describing the IP core's constraints. Space can also be reserved in the design for IP core of the trusted loader. The system structure can be specified using geometric placement constraints, for example. In a secure exchange framework, the geometric placement constraints of the application are shared with the IP vendor and the trusted loader. This allows the IP vendor to prepare an encrypted IP core for that specific location in the PLD's logic resources and provides the trusted loader with information on the location in which the vendor's decrypted configuration bitstream is to be loaded.

When the vendor agrees to provide a configuration bitstream for an IP core to a PLD, the customer can indicate the location to be taken by the IP core within design's structure. The interface of the IP core to the design can also be specified at this point. The vendor then invokes a modular design flow to create a configuration bitstream for that particular location in the target. The resulting partial bitstream is encrypted with a secret key known only to the vendor, who then makes the encrypted bitstream available for the customer's PLD to access via the chosen communication channel. The customer provides information such as a public key and, possibly, some unique identifier that is communicated to the vendor each time the IP core is requested. This allows the vendor's IP core server to determine whether or not the request is legitimate. At this stage, the vendor can apply accounting measures, if desired (for example, limiting the number of deployed IP-core bitstreams to a particular customer within a particular window of time).

An Example Secure Framework

Figure 2:
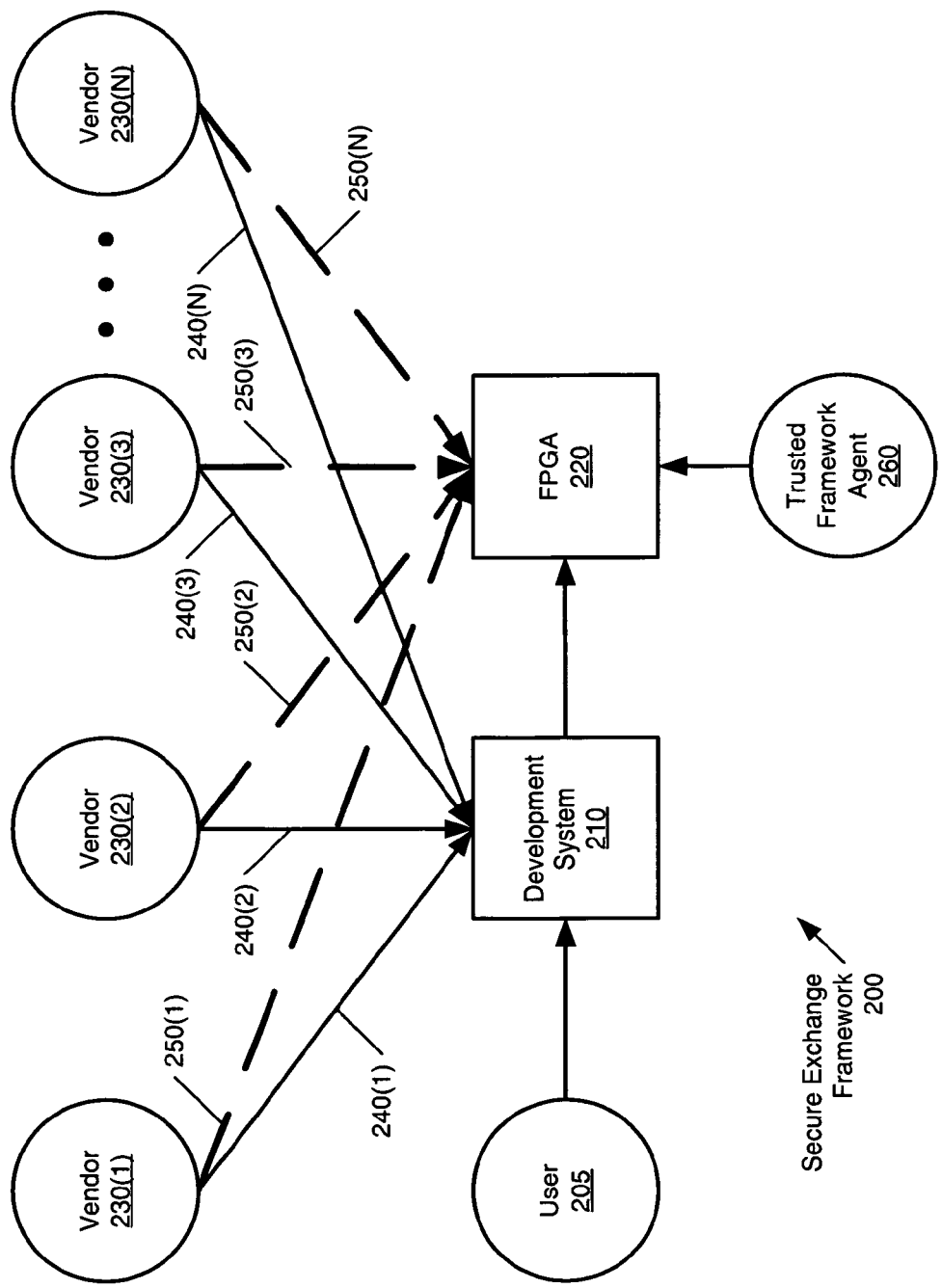
FIG. 2 is a block diagram illustrating a framework for the secure exchange of IP cores.

FIG. 2 is a block diagram illustrating a secure exchange framework 200 according to an embodiment of the present invention. A user 205 employs a development system 210 in order to program a target device such as a field-programmable gate array (FPGA) 220 or other programmable logic device (PLD). Development system 210 is an example of the design environment depicted in FIG. 1 (design environment 100). In secure exchange framework 200, one or more vendors (depicted in FIG. 2 as vendors 230(1)-(N)) provide one or more functional models to development system 210 via a corresponding one of communication channels 240(1)-(N). The functional models provided to development system 210 via communication channels 240(1)-(N) allow development system 210 to perform the optimization, mapping, placement and routing, and bitstream generation necessary to program FPGA 220, yet do not provide development system 210 with the actual IP core (e.g., a configuration bitstream that implements the IP core's design) for implementation in FPGA 220. Thus, secure exchange framework 200 allows for the separation of an IP core's functional model from its actual implementation.

Moreover, separation of the IP core's functional model from its actual implementation can be maintained throughout the process of delivering this information to the design environment and target devices separately. Thus, the provision of actual IP core(s) can be performed between vendors 230(1)-(N) and FPGA 220 (or a system including FPGA 220) via communication channels 250(1)-(N). As will be appreciated, communication channels 240(1)-(N) can be separate and distinct communication channels, shared communication channels divided only by destination, a single communication channel, or other such communications arrangement. This ability to vary the amount of separation employed in the delivery of the actual IP core(s) from other information regarding those IP core(s) allows the architect of such a secure exchange framework to select the simplest delivery method, while maintaining the requisite security.

In providing for such separation, development system 210 is able to generate a bitstream that allows FPGA 220 to be programmed with the requisite portions of a given design, save for the IP core(s) in question. Thus, the actual IP core(s) are available only to FPGA 220, and not to development system 220, and by extension, user 205 (e.g., a designer using development system 210). Secure exchange framework 200 can also be configured to protect the IP core(s) thus delivered from access by the end-users of FPGA 220, who might attempt to gain access to the IP core(s) stored in a configuration storage unit separate from FPGA 220 (and thus accessible to those parties). This level of protection can be accomplished by downloading the necessary IP core(s) only when FPGA 220 is initialized (or by maintaining them on-chip, once downloaded thereto), thereby preventing FPGA 220 from storing such information off-chip. At a minimum, such information can be encrypted (or re-encrypted) if it is to be communicated to off-chip storage.

Secure exchange framework 200 also includes a trusted framework agent 260. Trusted framework agent 260 can provide information to the PLD (e.g., FPGA 220) such as key information, a trusted loader (e.g., in the form of an IP core)

and the like. This can be done prior to the PLD being provided to user 205, during manufacturing of the device in which the PLD is used, during initialization if such a device or at another time. Such communications can occur over a secure channel (e.g., one or more of communication channels 250(1)-(N), when operated in a secure mode (e.g., a secure network tunnel or the like)). As noted, in addition to the PLD receiving the necessary key information, trusted framework agent 260 can also provide a trusted loader to the PLD. Typically, this will be in the form of a configuration bitstream that is subsequently programmed into the PLD (i.e., an IP core). However, other alternatives exist (e.g., a trusted loader can be pre-programmed into (or designed into) the PLD). Once configured, the trusted loader is then able to securely download the desired IP core(s) into the PLD.

Figure 3:
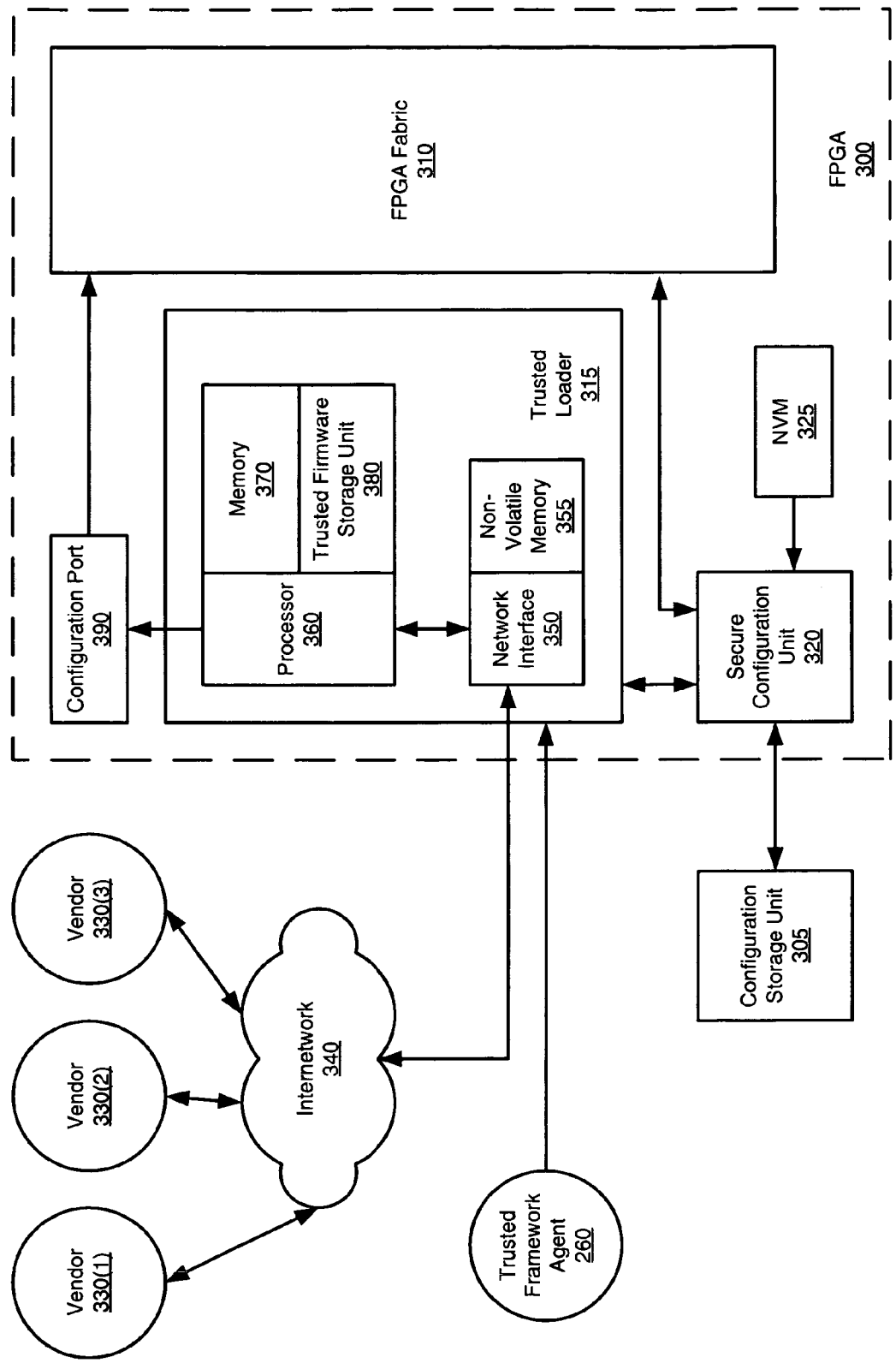
FIG. 3 is a block diagram illustrating a framework for the secure exchange of IP cores, showing further details of a field-programmable gate array (FPGA).

FIG. 3 is a block diagram illustrating the elements involved in the operation of a PLD according to an embodiment of the present invention (e.g., FPGA 220). In this embodiment, an FPGA 300 communicates with a storage configuration unit 305 in order to access information regarding the configuration of an FPGA fabric 310 of FPGA 300. More specifically, a trusted loader 315 of FPGA 300 accesses configuration information stored in configuration storage unit 305 via a secure configuration unit, and uses this information to program FPGA fabric 310 for the functionality desired (as indicated by the configuration information stored in configuration storage unit 305).

Secure configuration unit 320 retrieves an encrypted version of the skeleton design from configuration storage unit 305, and decrypts the encrypted skeleton design using encryption information stored in non-volatile memory (NVM) 325. For example, a symmetric encryption algorithm (in which the same key that encrypts a message also decrypts the message) can be used to encrypt and decrypt the skeleton design stored in configuration storage unit 305. Regardless of the method employed, the requisite keys (and/or other related information) can be stored in NVM 325. In certain embodiments, configuration information is stored in configuration storage unit 305. As noted elsewhere, this configuration information is referred to herein as a skeleton design, so-called because the design represented thereby is missing the portions of the configuration information corresponding to the one or more IP cores to be downloaded from vendors. In place of such information, the skeleton design contains only "gaps," in which the missing IP cores are to be inserted. Of course, such gaps may only be conceptual (and not be evidenced by missing stretches in a configuration bitstream for example). The operation of inserting an IP core in a gap is also referred to herein as "stitching" the IP core into the skeleton design.

Trusted loader 315, in embodiments of the present invention, includes a number of elements that allow FPGA 300 to access information regarding the IP core(s) that are needed to complete the skeleton design (e.g., that which is stored in configuration storage unit 305). Trusted loader 315 communicates with one or more vendors (depicted in FIG. 3 as vendors 330(1)-(3)) via an internetwork 340 (e.g., the case in which communication channels 240(1)-(N) and 250(1)-(N) employ a single, shared communications channel). Vendors 330(1)-(3) provide the requisite IP core(s) to trusted loader 315, which then inserts those IP core(s) in the design being programmed into FPGA fabric 310. As will be appreciated, this may occur prior to the skeleton design being loaded into FPGA fabric 310, during this operation, or after the skeleton design has been programmed into FPGA fabric 310.

Trusted loader 315 is able to access internetwork 340 (and so vendors 330(1)-(3)) via a network interface 350. Network interface 350 can use, for example, encryption/decryption keys, as negotiated with vendors 330(1)-(3), in securely communicating with vendors 330(1)-(3). Such keys, as well as other information needed to communicate with vendors 330 (1)-(3), can be stored in a non-volatile memory (NVM) 355. Network interface 350 provides for communications between a processor 360 and internetwork 350. Processor 360 accesses operating software stored in a memory 370, and security information stored in a storage unit within FPGA 300 (depicted in FIG. 3 as a trusted firmware storage unit 380). Trusted firmware storage unit 380 securely stores the programming needed by processor 360 to generate an overall design from the skeleton design and requisite IP core(s).

Trusted loader 315 includes a microcontroller core (e.g., processor 360) or the like, in which cryptography algorithms can be implemented in software. In the alternative, such algorithms can also be implemented in hardware. It will be appreciated that, in PLDs that include such functionality, existing hardware decryption facilities can be used as coprocessing peripherals to the microcontroller. The use of a microcontroller also allows for the alteration of the decryption algorithm. In some embodiments, the encryption/decryption algorithms are only used when the device is powered-up, and so any delays encountered in such a process have little effect on the actual operation of the PLD. To maintain security, trusted firmware storage unit 380 is only accessible to the microcontroller when the microcontroller is executing the public/private encryption code which was pre-defined when the trusted framework agent authored the trusted loader's design. The logic of trusted loader 315 is preferably designed to prevent the private key being read by code executing at any other address range.

Current generation PLDs inhibit partial reconfiguration to prevent a hostile party from using partial reconfiguration in order to snoop information from the encrypted configuration while the configuration is "live" on the PLD. A secure exchange framework of an embodiment of the present invention provides the ability to perform subsequent (partial) configurations on the device, even after the PLD has been securely configured. The ability to perform such configurations is made possible by allowing trusted loader 315 to control the PLD's internal configuration access port (e.g., depicted in FIG. 3 as a configuration port 390). External configuration access can remain disabled. If trusted loader 315 is implemented in hardware, trusted loader 315 can be provided with a dedicated configuration port interface. Alternatively, a soft IP version of trusted loader 315 accesses the standard configuration port which has been allowed to remain active after configuration.

In addition to its ability to acquire and decrypt bitstreams, trusted loader 315 can also apply access control restrictions that constrain the location(s) in which an IP core can be configured into the PLD. Such constraints are equivalent to a floorplan of the design in question. The access control component of the trusted loader's firmware warrants these three properties: first, an acquired and decrypted IP core will configure into the region prescribed in the customer's original design; second, the target region for configuration matches the one intended by the vendor; and, third, that no regions overlap. With such a mechanism, the loader is able to block a variety of hostile behaviors by IP vendors, customers and others. In particular, a customer can only receive an IP core for a pre-defined location in a given PLD. Vendors can only place their IP core(s) in the region agreed upon with their customers. Inconsistencies in an IP core's destination location can be made to cause trusted loader 315 to halt its operations, issue an attack warning over the network connection and/or perform some other appropriate action(s). All of these policies are defined in advance and enforced by firmware of trusted loader 315 as the trusted loader attempts to configure one or more IP cores into its host PLD.

Thus, the trusted loader ensures that the IP core(s) received cannot perform illegal configurations within or over the skeleton design. In a design flow where trusted loader 315 is aware of the size and geometry of the holes within the skeleton design, trusted loader 315 is able to prevent the insertion of malicious configuration bitstreams. Trusted loader 315 can also be made aware of the particular vendors and IP cores that are to be inserted into the gaps in the skeleton design. Upon receiving the IP core destined for a specific gap, trusted loader 315 is able to verify (either by batch analysis of the IP cores' configuration data or dynamic monitoring of each part of the configuration as it is applied) that a given IP core is indeed trying to configure the correct parts of the design and has not over-reached its bounds. Thus, in certain embodiments of a design flow of the present invention, a specific step is taken, during which the customer/target device negotiates for the delivery of the IP core for a specific geometric size and placement of the IP core.

Configuration port 390 provides a mechanism for trusted loader 315 to program the skeleton design and requisite IP core(s) into FPGA fabric 310. In one embodiment, configuration port 390 is available to trusted loader 315 and other internal logic resources of FPGA 300, after FPGA 300 has been initially configured. Configuration port 390, in certain embodiments, allows partial reconfiguration of FPGA fabric 310. By supporting partial configuration and the configuration of a communication interface (e.g., network interface 350), configuration port 390 enables the programming of the skeleton design, and the acquisition and programming of the IP core(s) needed to complete the overall design.

In certain embodiments, a secure exchange framework of the present invention requires non-volatile key storage, although the exact storage requirement varies by embodiment. When trusted loader 315 is implemented in a PLD's logic resources, non-volatile key storage is typically needed for at least a single key. In one embodiment, configuration storage unit 305 contains configuration bitstream of a trusted loader 315, possibly amalgamated with the configuration bitstream of the skeleton design stored therein. As will be apparent, the circuitry of trusted loader 315 should not be allowed to be replaced by any circuitry. To make configuration bitstream of trusted loader 315 tamperproof, the existing encryption hardware is used. The trusted framework agent programs the non-volatile key register of the PLD (e.g., NVM 325 and/or 355). The trusted framework agent needs to be able to program keys into 325 to insure the privacy of any trusted loader bitstream being held in the secure storage device outside the FPGA. 355 must also be accessible to the trusted framework agent so that the dedicated NVM used by the loader can be programmed with the appropriate public/private keys.) and does not reveal the key to the customer or other vendors. The trusted framework agent can then provide an encrypted trusted loader configuration bitstream with the public and private keys stored therein.

In the case where the trusted loader core is implemented in hardware, non-volatile storage is needed only for the public and private encryption keys (e.g., trusted firmware storage unit 380). The trusted framework agent programs these registers in the PLD before the PLD is delivered. This bypasses the need for encryption between the initial configuration source and the PLD. In one embodiment, the binary code executed by the loader's microcontroller exists as a read-only memory (ROM) within the PLD. Any code that is "trusted" (i.e., has the ability to read the private key register) should be able to provide a guarantee that its origin can be trusted (e.g., the origin was the trusted firmware agent). For flexibility, firmware of trusted loader 315 can be stored in configuration storage unit 305. If this is the case, the code is encrypted and the PLD must have a pre-programmed, non-volatile key register, programmed with the key that governs the transfer of the program code to the microcontroller.

In a secure communications environment, trusted firmware storage unit 380 can also be used to store the encryption information (e.g., keys) to be used by the PLD in acquiring one or more IP cores. For example, this encryption information might include a private key, in the case in which a public/private key encryption system (as described earlier) can be employed. This capability allows us to secure the exchange of the vendor's IP with the FPGA in the customer's deployed system. The private key is programmed into the FPGA by the trusted framework agent before the devices are delivered to the customer. Once programmed, the private key is never revealed to the outside world. The trusted framework agent can even discard knowledge of the private key.

This encryption information (or subsets thereof) can then be used for securely communicating with vendors, for decrypting IP cores received from a vendor, authenticating a vendor, decrypting information from storing encrypted information in configuration storage unit 305, and for other such uses. Moreover, subsections of the trusted loader 315 can be used as an encryption/decryption unit for FPGA fabric 310 (both for information into and out of the FPGA fabric 310, and as a part of a design implemented in FPGA fabric 310).

In one embodiment of the present invention, an IP vendor can create, in conjunction with the use of a "smart" loader such as trusted loader 315, what is in effect an encrypted "partial configuration bitstream" based on a IP core. In the posited embodiment, this partial configuration bitstream is bounded to a specific XxY area, at a specific location, within FPGA fabric 310. Because the partial configuration bitstream is designed to be implemented in a specific section of the FPGA's fabric, a fabric I/O interface template can be created that provides the interconnect information needed to "stitch" the partial configuration bitstream into the end-user's skeleton design.

The use of a microprocessor-based loader such as trusted loader 315 also allows for more complex bitstream manipulation. For example, unrelated routes through the IP core's XxY area of the PLD can be added in order to reduce routing congestion at the system level. Another example is the sparing of bad rows/columns within a PLD. With a trusted loader such as that described herein, and extending the unique part ID to include a map of bad rows and columns in a PLD implementing an embodiment of the present invention, the configuration engine can have the information needed to modify configuration bitstreams, in order to spare bad rows and columns. Thus, IP cores delivered using an embodiment of the present invention can be "spread" to avoid bad columns and rows within the PLD, allowing for some degree of recoverability in the face of damage to the PLD being programmed.

As will be appreciated, methods and systems according to an embodiment of the present invention can be applied with equal success to the skeleton design itself. In such a case, the designer of the skeleton design makes the skeleton design available for download, in the manner of an IP core in the approaches described herein. This approach can be envisioned by removing configuration storage unit 305, and adding another "vendor," which is the source of the skeleton design.

In situations in which the device does not have a persistent network connection, it is advantageous to have a mechanism for caching an assembled configuration bitstream in a non-volatile configuration storage unit. This can be accommodated using techniques of the present invention, so long as the device has access to a communications connection prior to being shipped. The PLD uses the method above to receive encrypted versions of vendor IP cores, decrypts these IP cores and assembles the decrypted IP cores into the overall configuration bitstream. The assembled configuration bitstream is then re-encrypted with a secret key known only to the PLD (either the private half of its public-private key pair, one of its symmetric keys or in some similar manner). This newly-encrypted configuration bitstream is then written into configuration storage unit 305. When the system is powered on, the PLD retrieves the encrypted, previously-assembled configuration bitstream and decrypts it with the appropriate internal key. The decryption is performed entirely within the PLD to prevent any observation of the decrypted bitstream while being transferred into the PLD's configuration memory. The channel between the PLD and its configuration storage unit also remains secure by virtue of the data transfer being encrypted with the internal, secret key.

A trusted framework agent is trusted to select the public, private and symmetric keys. An alternative mechanism can be employed that uses a random (or pseudo-random) number source to generate each of the keys when the device is first initialized. The PLD writes the randomly generated numbers into its non-volatile key registers, where the numbers persist through the lifespan of the device or until the numbers are explicitly regenerated. A non-volatile "set" bit stored with the key registers indicates to the power-on logic whether or not new random keys should be generated, and the existing key register data overwritten. The same mechanisms to prevent untrusted circuitry or code from accessing private or secret key registers can also be used to protect the randomly generated keys.

The foregoing features support the secure downloading of one or more IP cores in a secure exchange framework of an embodiment of the present invention. The following is an example of the sequence of events that occur when the customer's board wishes to acquire one or more IP cores using such an approach.

An Example of the Operation of a Trusted Loader

In operation, trusted loader 315 communicates with the vendor's IP-core server, directly, or negotiating through a proxy, via internetwork 340. Trusted loader 315 identifies itself with its public key (and/or some other unique identifier), and requests the delivery of the required IP core.

The vendor's IP core server receives the request for the IP core and determines whether or not the request should be fulfilled. The IP core server tracks which customers are allowed to receive which encrypted IP cores, and may reject the request because the customer's public key (or unique identifier) is not registered to receive the requested core.

If the customer is indeed registered to be granted access to the encrypted IP core, the IP core server can choose to authenticate the requestor. In one embodiment, to authenticate the customer, the vendor's IP server sends a message to the requestor, and asks the requestor to encrypt the message with its private key. The requestor does this and returns the encrypted message to the IP core server. When the IP core server receives the response, the IP core server decrypts the encrypted message using the requestor's public key—this will weaken security. The public key of the requestor must already be known to the IP Core server, specified when the IP customer licenses/purchases the IP from the vendor). If the decrypted message matches the message the IP core server sent, the IP core server is able to conclude that it is indeed communicating with the identified requestor. (The encryption-decryption relationship of the key-pair is at the basis of this conclusion, of course.) This authentication step is optional, and can be avoided if the vendor is not concerned with third parties masquerading as a valid customer because the perpetrator has discovered a public key. Since such third parties do not know the private key, such third parties are unable to decipher any encrypted response from the IP core server. In an alternative embodiment, the IP core server encrypts a message using the requestor's public key and sends the encrypted message to the requestor. The requestor decrypts the encrypted message using the requestor's private key and sends the clear text message back to the IP Core Server. The IP Core Server compares the received clear text message with the original message and if they match, the IP core server is able to conclude that it is indeed communicating with the identified requestor.

At this point, the vendor is ready to provide the encrypted IP core and the keys required to decrypt the encrypted IP core to the requestor. The vendor trusts that, because the vendor is communicating with a trusted loader (e.g., trusted loader 315), it is safe to reveal the decryption key over a channel encrypted with the requestor's public key. There are a number of ways to proceed from this point.

In the first instance, the data of the encrypted configuration bitstream and its associated decryption key can be encrypted with the requestor's public key and sent back to the requestor for decryption with its private key. When the data arrives at the requestor, the data is decrypted with the private key. This reveals the encrypted IP core and its decryption key to the trusted loader, which proceeds to decrypt the IP core with the key (according to a pre-arranged encryption algorithm). The results of this decryption can be configured into the PLD (e.g., at the appropriate location specified in the application structure).

Such a process, while effective, can be computationally expensive—public key encryption algorithms often require more computational resources than symmetric algorithms. For that reason, in certain embodiments, public key encryption is used only to exchange a session-key that can then be used in a less expensive symmetric encryption algorithm (in this case, the session key is the decryption key for the vendor's IP core), rather than using the public key encryption algorithm for all communications (including the transfer of the IP core). The remainder of the communications are encrypted with the session key, which is known only to the requestor.

It should also be noted that the encryption algorithm used for the vendor's IP core need not be pre-ordained. A program for a particular decryption algorithm can be delivered to the requestor along with the key. Transmission of both the key and decryption program remain secure as both are encrypted with the requestor's public key. When the requestor receives the transmission of the vendor's encrypted IP core, the requestor executes the decryption program supplied with the decryption key to decrypt the transmission. The trusted framework agent can also implement a series of algorithm modules on the loader platform that can be communicated with the decryption key. Encryption techniques to verify the authenticity of algorithms delivered in this manner can also be applied at the vendor's IP core server and at the requestor. Such processes are now described in greater detail in connection with FIGS. 4, 5, 6, 7, 8, 9, 10, 11 and 12.

An Example of the Operation of a Secure Exchange Framework

Figure 4:
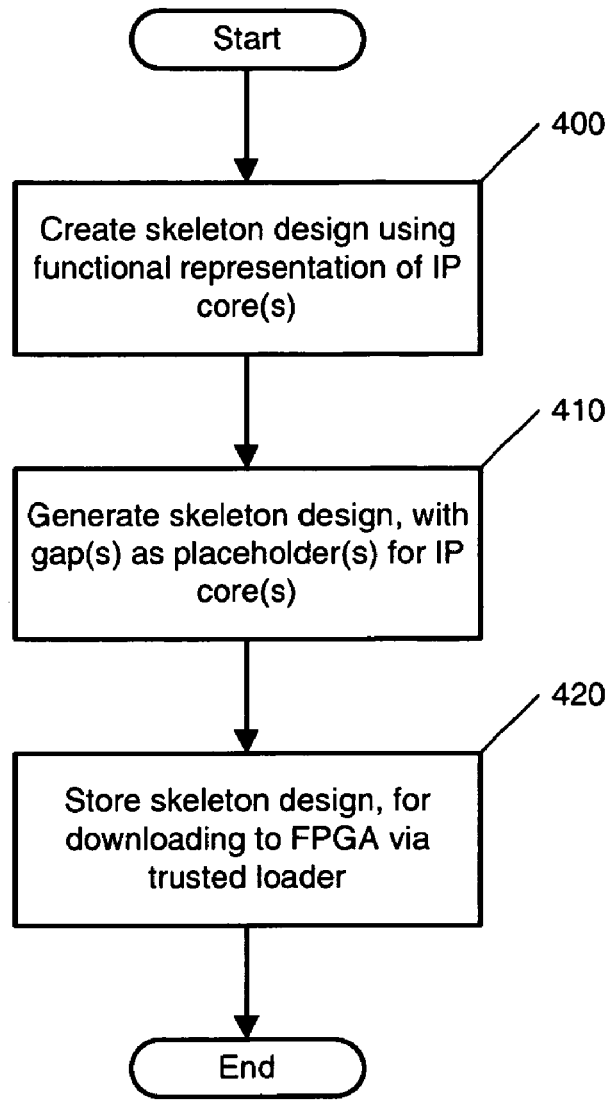
FIG. 4 is a flow diagram illustrating an example of actions performed in a framework of the present invention.

FIG. 4 is a flow diagram illustrating an example of the actions performed in a framework according to an embodiment of the present invention. The process begins with the creation of a skeleton design using a design environment such as that shown in FIG. 1 (step 400). In creating such a skeleton design, a user (e.g., user 205 of FIG. 2) employs functional representations of one or more IP cores. These functional representations are used by the development system for optimization, mapping, placement and routing, and bitstream generation of the skeleton design, as well as analysis simulation and verification of the design. However, such functional representations omit the information that would otherwise be necessary to generate a complete configuration bitstream for the design (including the one or more IP cores).

Given that the functional representations include sufficient information to allow for the generation of the remainder of the design (thus, the term skeleton design), the configuration bitstream for the skeleton design is then generated (step 410). As will be appreciated, the skeleton design thus generated will include gaps (if only conceptual), and can, in fact, include placeholders for the IP cores' configuration bitstreams to be inserted therein. Once generated, the skeleton design is stored (step 420). Typically, the skeleton design will be stored "off-chip" in a configuration storage unit such as a programmable read-only memory (PROM), flash memory or the like (e.g., configuration storage unit 305).

As noted, FIG. 4 depicts a flow diagram illustrating a process according to an embodiment of the present invention, as do the other flow diagrams presented herein. It is appreciated that operations discussed herein may consist of directly entered commands by a computer system user or by steps executed by application specific hardware modules or a combination thereof, and may be performed in any convenient and appropriate order. The functionality of steps referred to herein may correspond to the functionality of modules or portions of modules.

The operations referred to herein may be modules or portions of modules (e.g., software, firmware or hardware modules). For example, while the described embodiment includes field-programmable gate arrays, application specific integrated circuits and other such hardware modules, the various example modules may be implemented as software modules and/or include manually entered user commands. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a PLD (e.g., an FPGA), the design of a gate array or full-custom application-specific integrated circuit (ASIC), or the like.

Figure 5:
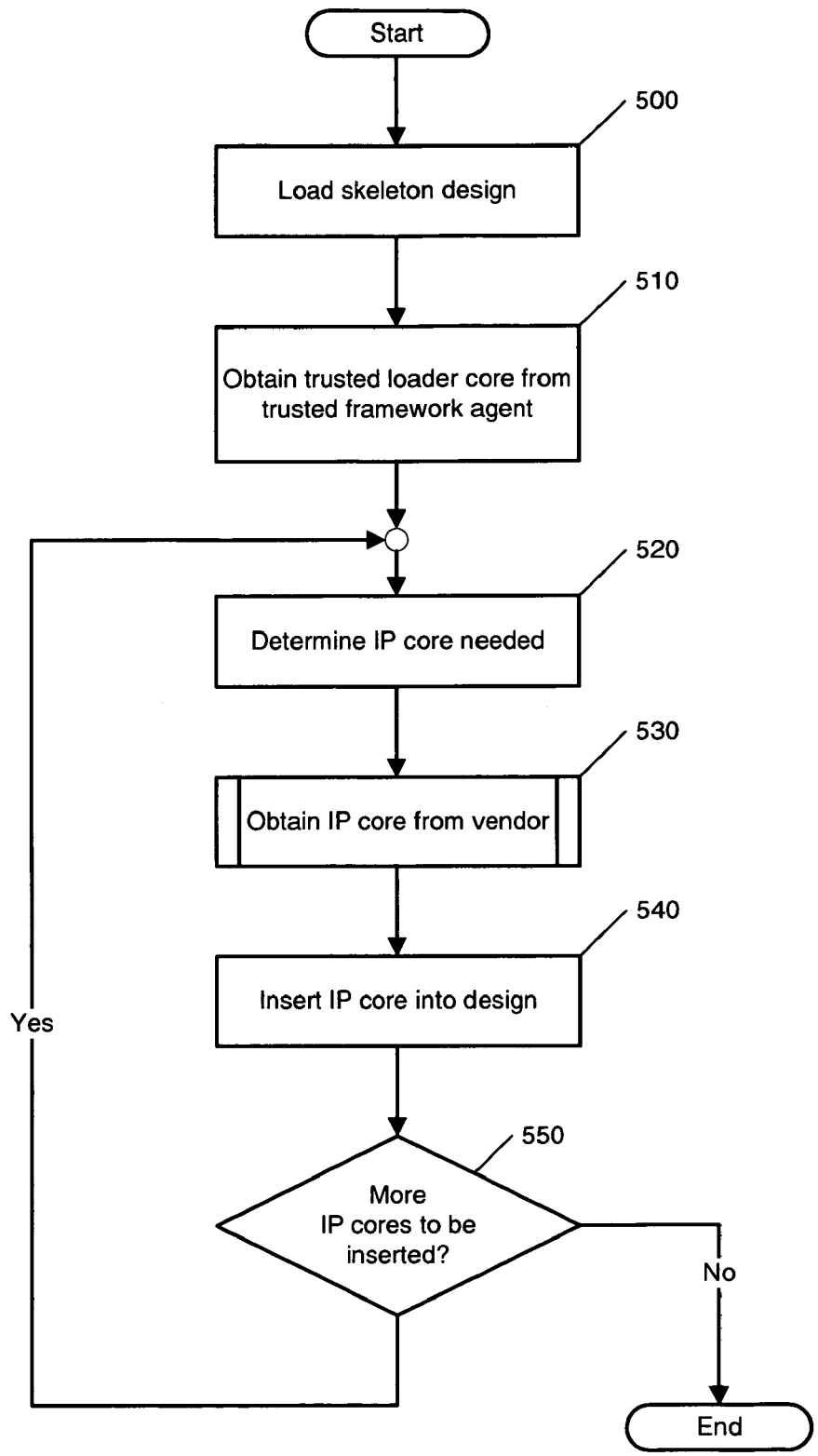
FIG. 5 is a flow diagram illustrating an example of actions performed in a method of loading a skeleton design into an FPGA.

FIG. 5 is a flow diagram illustrating an example of the actions performed in a method of loading a skeleton design into a PLD such as an FPGA. The process begins with the loading of a skeleton design (i.e., the configuration bitstream having "gaps" corresponding to the IP core(s) which are to be downloaded into the FPGA) from a configuration storage unit into the FPGA (step 500). Next, an IP core corresponding to the trusted loader is obtained from the trusted framework agent (step 510). As will be appreciated, an alternatively to obtaining the trusted loader core from the trusted framework agent is to simply pre-program the FPGA with the trusted loader core, or to design the trusted loader into the FPGA in hardware. Once the trusted loader is available (by whatever means), a determination is made as to which IP core is needed (step 520). As will be appreciated, this determination is made on an "IP core-by-IP core" basis.

Once the IP core that is needed has been identified, that IP core is obtained from its vendor (step 530). A process for obtaining an IP core from a vendor is discussed in connection with FIG. 6. Once obtained, the IP core is then inserted into the skeleton design (step 540). As noted elsewhere, this insertion can take place during the loading of the skeleton design into the FPGA, during the programming of the FPGA's fabric or after the FPGA's fabric has been programmed with the skeleton design (in which case the skeleton design and requisite IP cores are programmed into the FPGA's fabric separately). Also, the IP core can be validated at this time through the use of a one-way hash function or comparable mechanism, with the hash value for the IP core being communicated to the target via a secure session with the vendor, for example.

A determination is then made as to whether further IP cores remain to be inserted into the skeleton design (step 550). If further IP cores remain to be inserted, the process loops to the determination as to which IP core is to be programmed into the FPGA next (step 520). If no further IP cores remain to be inserted, the process concludes.

Figure 6:
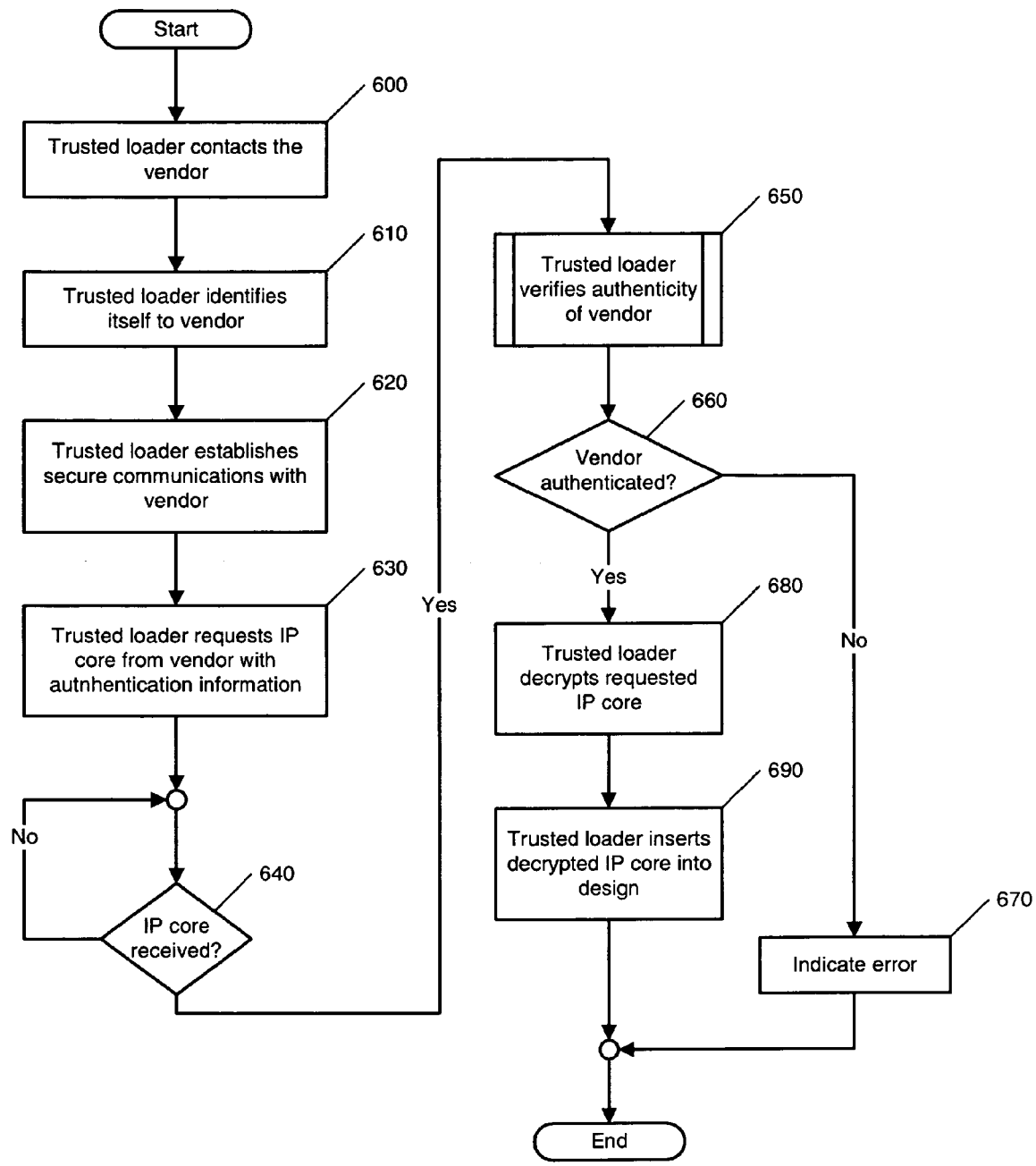
FIG. 6 is a flow diagram illustrating an example of actions performed in a method of requesting an IP core from a vendor.

FIG. 6 is a flow diagram illustrating an example of the actions performed in a method of requesting an IP core from the vendor according to an embodiment of the present invention. The process begins with the trusted loader contacting the vendor to arrange the download of the desired IP core(s) (step 600). The trusted loader then identifies itself to the vendor (step 610). This can be done, for example, using the PLD's public key, an identifier, or using some other mechanism.

Having identified itself to the vendor, the trusted loader then establishes secure communications with the vendor (step 620). This can be accomplished using the symmetric key-encryption algorithm transfer noted earlier, for example. Using this non-secure communications channel, the trusted loader then requests the desired IP core from the vendor, providing the vendor with authentication information (authenticating the identity of the trusted loader) (step 630). Authentication can be accomplished using the public/private key encryption technique discussed earlier, or by some other mechanism. The trusted loader then awaits receipt of the requested IP core (step 640). It will be appreciated that, although the IP core thus requested is discussed in the singular herein, it is intended that the invention is described herein comprehend the downloading of multiple IP cores from a single vendor in response to a single request, or some combination thereof.

Once the requested IP core has been received, the trusted loader then verifies the authenticity of the vendor providing the IP core (step 650). A process for vendor authentication is described in connection with FIG. 7. As will be appreciated, this verification step is not mandatory, but is an additional feature made possible by an embodiment of the present invention. If the vendor is not authenticated (step 660), an error is indicated (step 670) and the process concludes.

However, if the vendor is authenticated (step 660), the trusted loader decrypts the requested IP core received from the vendor (step 680). The trusted loader then inserts the decrypted IP core into the skeleton design (step 690). As noted elsewhere herein, the insertion of the IP core into the skeleton design can be achieved in any one of a number of ways. For example, the decrypted IP core (now a configuration bitstream) can be inserted into the configuration bitstream prior to the configuration bitstream being programmed into the FPGA's fabric, thus creating a complete configuration bitstream prior to the programming of the FPGA's fabric. Alternatively, the configuration bitstream for the IP core can be inserted into the configuration bitstream of the skeleton design as the configuration bitstream for the skeleton design is programmed into the FPGA's fabric, thus implementing an "on-the-fly" programming methodology. Another alternative is to allow the trusted loader to program the skeleton design's configuration bitstream into the FPGA's fabric, and subsequently program the IP core(s) configuration bitstream into the gaps existing in the skeleton design programmed into the FPGA's fabric. These operations are referred to herein as "stitching" the IP core into the skeleton design.

Figure 7:
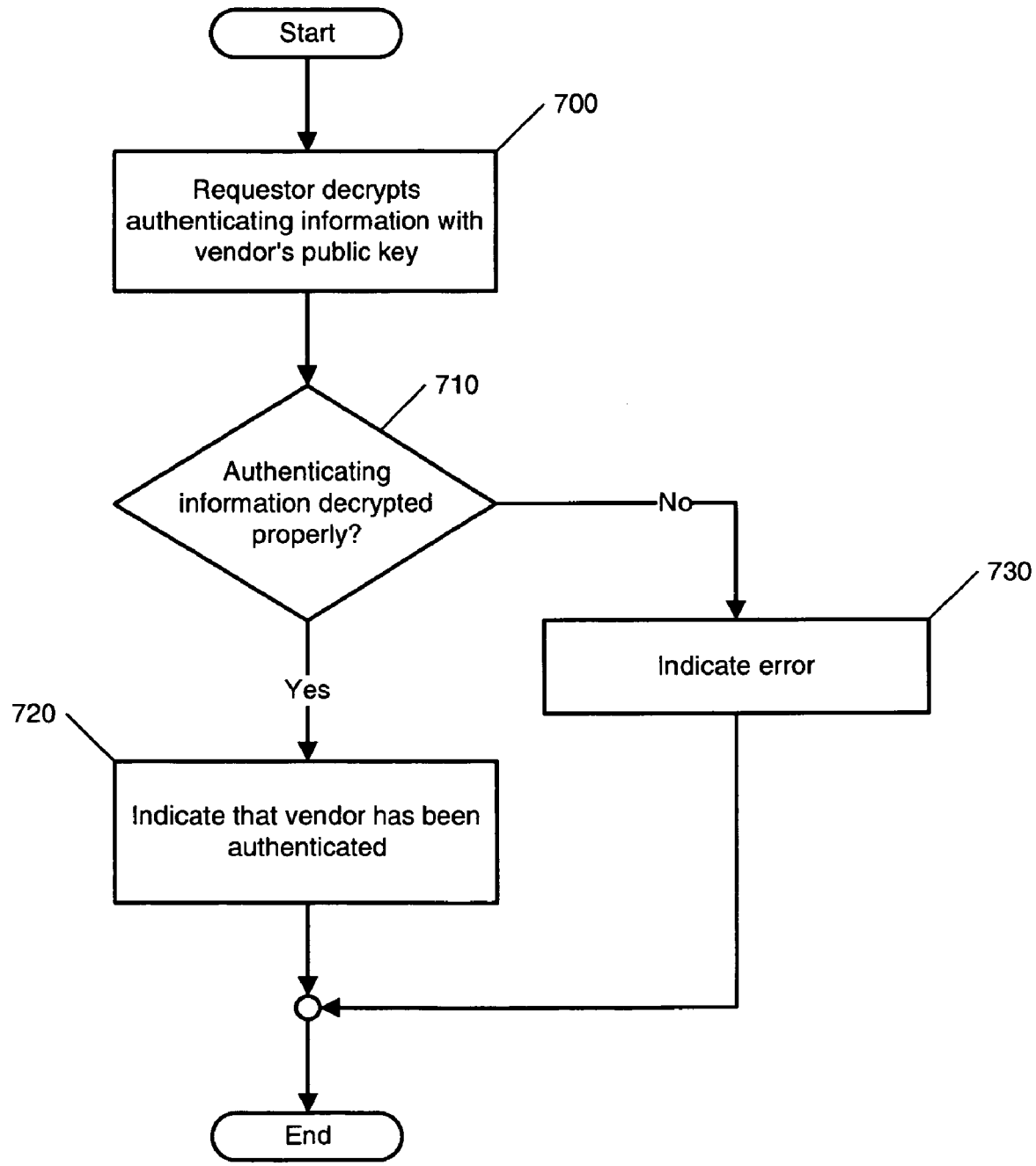
FIG. 7 is a flow diagram illustrating an example of actions performed in authenticating a vendor.

FIG. 7 is a flow diagram illustrating an example of the actions performed in authenticating a vendor. In one embodiment, when vendor authentication is implemented, the vendor encrypts information (e.g., some known cleartext, such as identifying information of the requested IP core) using the vendor's private key. Thus, in such a case, the process of authenticating a vendor at the requestor begins with the decryption of the authenticating information sent by the vendor, using the vendor's public key (step 700). As will be appreciated, in the embodiment discussed presently, authentication is provided through the use of a public/private key technique. Other authorization techniques can also be used, with equal success.

A determination is then made as to whether the authenticating information was properly decrypted (step 710). This might be, for example, determining if an identifier identifying the requested IP core was properly decrypted. If the authenticating information is decrypted properly, the vendor's authenticity is indicated (step 720). However, if the vendor is not properly authenticated, an error is indicated (step 730). The process then concludes.

Figure 8:
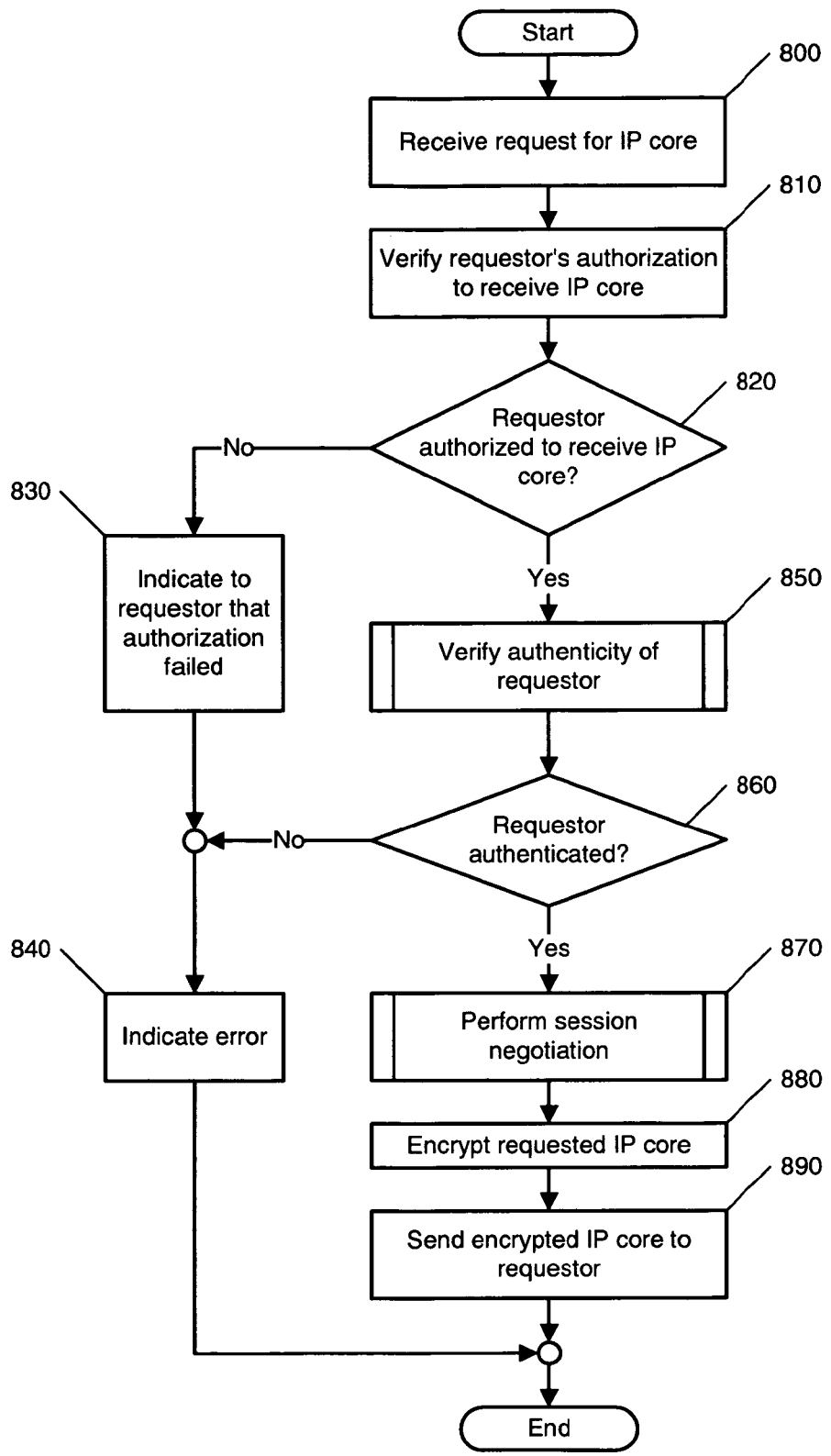
FIG. 8 is a flow diagram illustrating an example of actions performed by a vendor in providing an IP core to a requestor.

FIG. 8 is a flow diagram illustrating an example of the actions performed by a vendor in providing an IP core to a requestor. It should be noted that, and as will be apparent, such a requestor can be an FPGA or other PLD, a device including such a PLD, an entity programming such a device or PLD, or other such entity or device. The process of a vendor's providing an IP core to a requestor begins with the receipt of such a request for an IP core (step 800). As noted earlier, this request may be for one or more IP cores.

Next, the vendor verifies the requestor's authorization to receive the requested the IP core (step 810). If the requestor is not authorized to receive the IP core (step 820), an indication is made to the requestor that the requestor has failed the authorization process (step 830). An error is then indicated at the vendor to indicate to the responsible parties that an authorization failure has occurred (step 840), and the process concludes.

If the requestor is authorized to receive the IP core (step 820), the requestor's authenticity is then verified (step 850). A process for requestor authentication is described in connection with FIG. 9. If the requestor is not authenticated (step 860), an error is once again indicated to those responsible, on the vendor side (step 840). If the requestor is both authorized (step 820) and authenticated (step 860), session parameters are negotiated between the requestor and the vendor (step 870). A process for session negotiation is described in connection with FIG. 10. Once session parameters have been successfully negotiated, the vendor encrypts the requested IP core (step 880). This encryption process can use the requestor's public key (in a public/private key implementation), a pre-defined key or a key defined in some other manner. Once the IP core has been encrypted, the encrypted IP core is sent to the requestor (step 890), and the process concludes.

Figure 9:
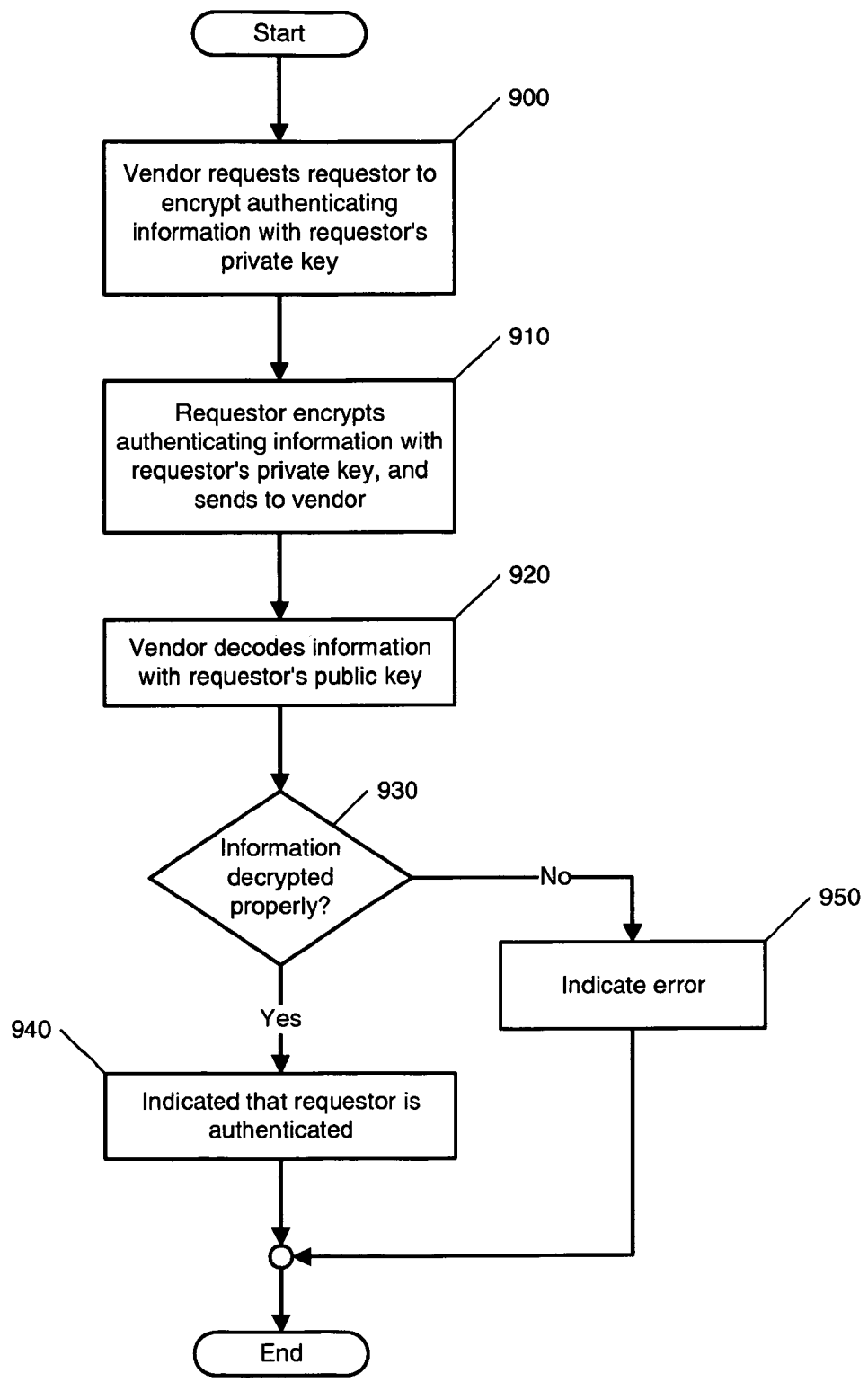
FIG. 9 is a flow diagram illustrating an example of actions performed in authenticating a requestor.

FIG. 9 is a flow diagram illustrating an example of the actions performed in authenticating a requestor. The process begins with the vendor requesting that the requestor encrypt authenticating information with the requestor's private key (step 900). As has been noted elsewhere, the embodiment described presently employs a public/private key technique, although it will be apparent to one of skill in the art that other authentication techniques can be used with equal success. Next, in response to the vendor's request, the requestor encrypts authenticating information with the requestor's private key, and sends this encrypted authenticating information to the vendor (step 910). Once the vendor has received this encrypted authenticating information, the vendor decodes the encrypted authenticating information with the requestor's public key (step 920). If the encrypted authenticating information is decrypted properly (step 930), an indication is made that the requestor has been properly authenticated (step 940). However, if the information is not properly decrypted (step 930), an error is indicated (step 950) and the process concludes.

Figure 10:
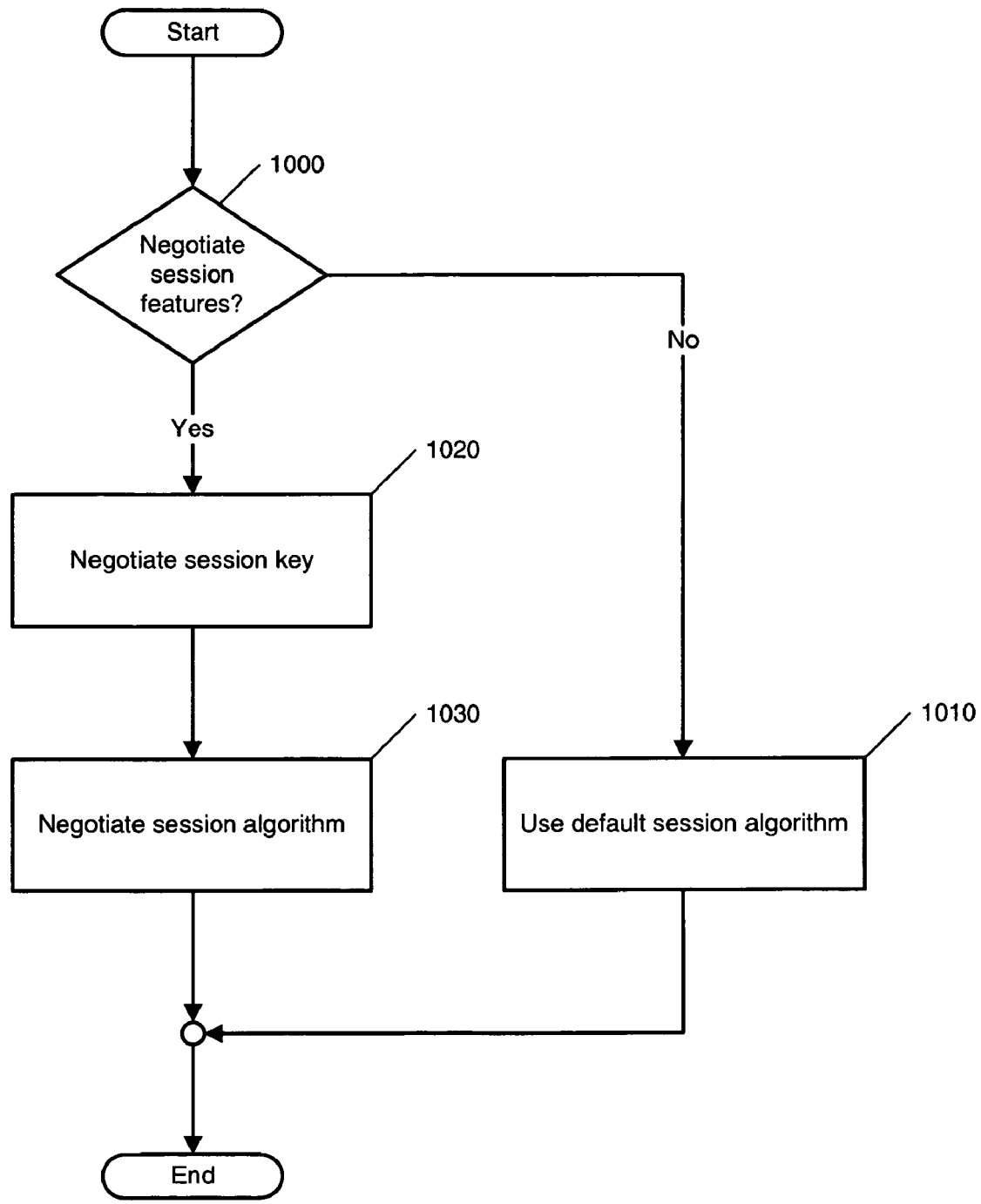
FIG. 10 is a flow diagram illustrating an example of the actions performed in negotiating session parameters between a requestor and a vendor.

FIG. 10 is a flow diagram illustrating an example of the actions performed in negotiating session parameters between a requestor and a vendor. The process begins with a determination as to whether the various session features need to be negotiated (step 1000). If session features are not to be negotiated, a default session algorithm is used (step 1010). If session features are to be negotiated, the requestor and vendor then negotiate a session key (step 1020). As noted earlier, this allows a symmetric key to be determined, while protecting the symmetric key within a public/private key transaction. Next, a session algorithm is negotiated (step 1030). As noted earlier, this allows an encryption algorithm to be selected "on-the-fly," and transferred to the requestor, for use thereby in the transfer of one or more IP cores. The process then concludes.

Figure 11:
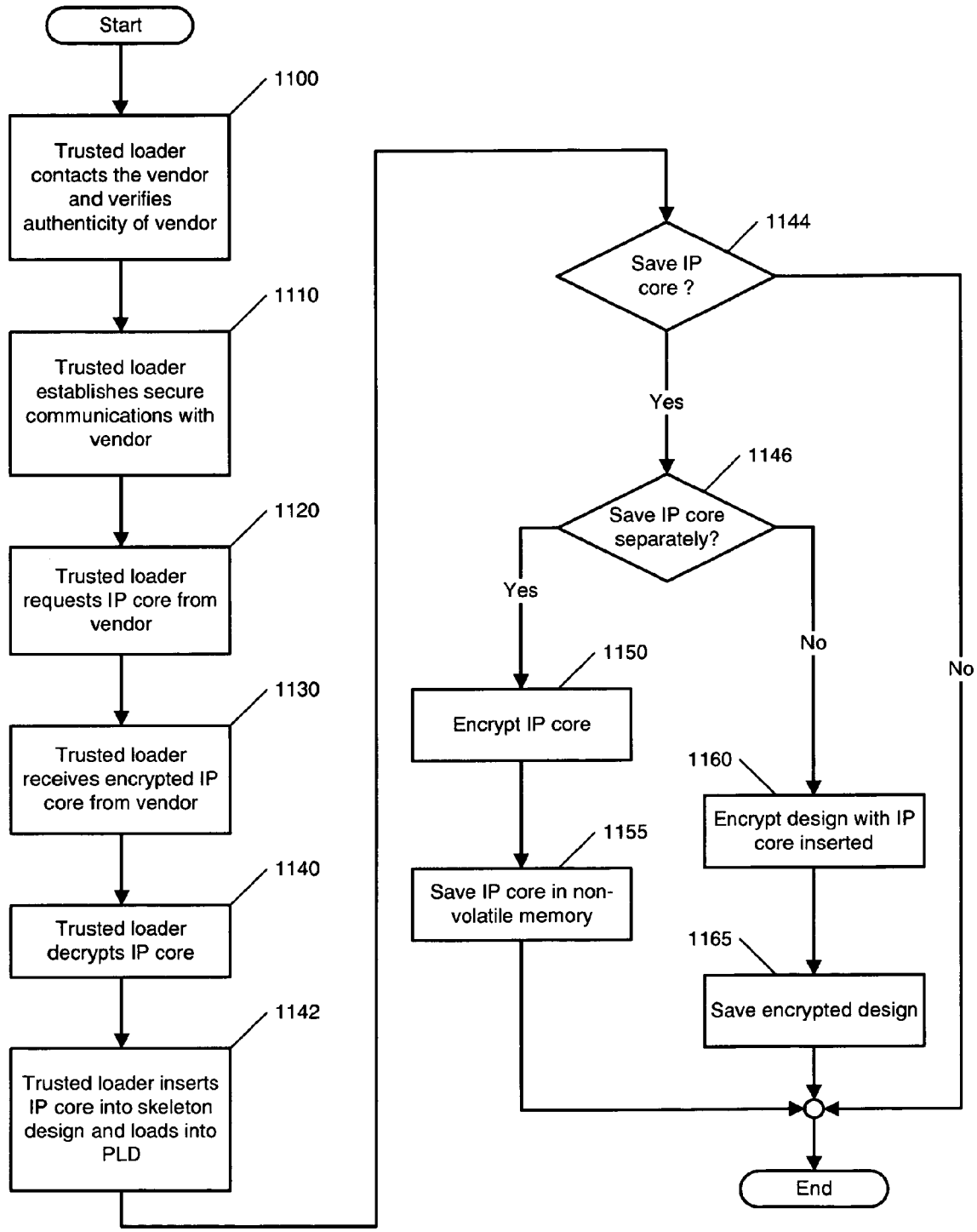
FIG. 11 is a flow diagram illustrating an example of actions performed in storing one or more IP cores downloaded from a vendor.

FIG. 11 is a flow diagram illustrating an example of the actions performed in storing one or more IP cores downloaded from a vendor. The process begins with the trusted loader contacting the vendor and verifying the vendor's authenticity (step 1100). The trusted loader then establishes a secure communications channel with the vendor (step 1110). Once a secure communications channel is established with the vendor, the trusted loader requests the desired IP core from the vendor (step 1120). In response, assuming that the requestor is authorized and authenticated, the trusted loader receives an encrypted version of the IP core from the vendor (step 1130). The trusted loader then decrypts the encrypted IP core in order to gain access to the requisite configuration bitstream (step 1140). Next, the trusted loader inserts the IP core into the skeleton design, loading the design into the PLD (step 1142). As noted earlier, this operation can be performed prior to, during or after the skeleton design is loaded into the PLD's fabric.

A determination is then made as to whether the IP core is to be saved (step 1144). If the IP core is not to be saved, the process concludes. If the IP core is to be saved, a determination is then made as to whether the IP core should be saved as part of the configuration bitstream for the overall design (i.e., the complete design is to be saved), or whether the IP core should be saved separately (step 1146). If the IP core is to be saved separately, the IP core is encrypted (step 1150) and saved (step 1155). As will be appreciated, the IP core can be saved in non-volatile memory in its encrypted state, in off-chip storage (e.g., in certain embodiments in a configuration storage unit) or in some other location.

If the IP core is not to be saved separately (meaning that the IP core will be saved along with the rest of the overall design), the overall design (its configuration bitstream) is encrypted with the IP core inserted therein (step 1165). Once the overall design is encrypted, the encrypted design (including the IP core) is saved (step 1165). As noted previously, the encrypted design can be saved in a non-volatile memory (on-chip), off-chip (e.g., in a configuration storage unit) or in some other location.

Figure 12:
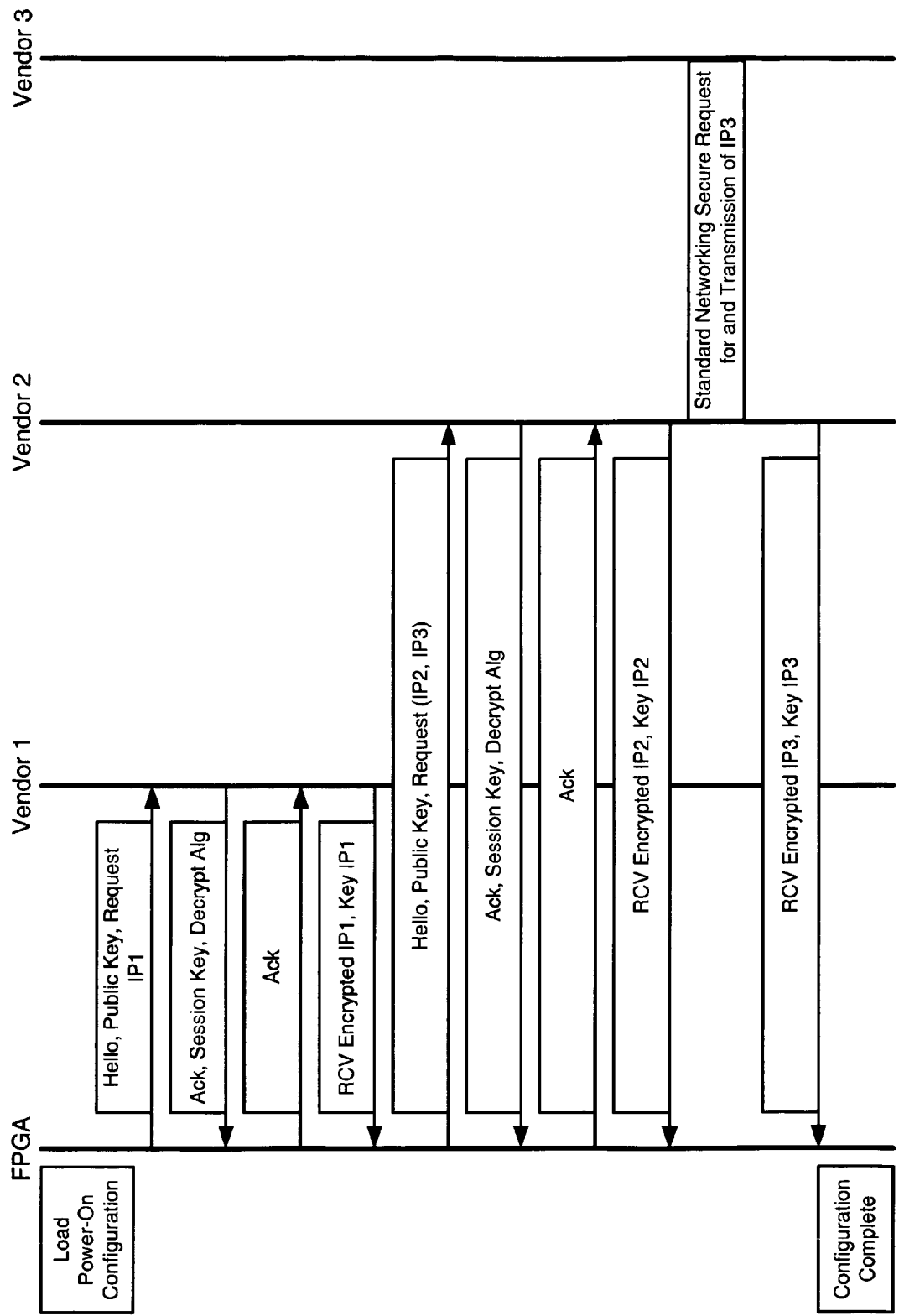
FIG. 12 is a diagram illustrating an example of transactions between a requestor and several IP core vendors securely exchanging IP cores in a framework of the present invention.

FIG. 12 is a diagram illustrating an example of the transactions that might occur between a requestor (e.g., an FPGA) and a number of IP core vendors. In this illustration, the requestor and IP vendors are able to securely exchange IP cores using a framework of an embodiment of the present invention. The process begins with the FPGA loading a power-on configuration. This can include, for example, the main configuration information needed to implement the design (e.g., configuration bitstream of the skeleton design), and subsequently, the trusted loader.

The FPGA then sends a "hello" message to vendor 1. The FPGA also sends vendor 1 its public key and a request for an IP core (identified in FIG. 12 as IP1). Vendor 1 responds with an acknowledgment. Vendor 1 then responds with a session key (the encryption key to be used for secure communication between FPGA and vendor 1 during this session) and the decryption algorithm to be employed during the session. A hash function (for use in generating a message digest or comparable verification information) can also be passed at this time.

In settling on a session encryption algorithm to be used, the vendor and target device negotiate the particular cipher algorithm to be used for the transmission session. This can be accomplished in a number of ways. For example, the negotiation can involve selecting the session encryption algorithm from a preset list of algorithms. Alternatively, the negotiation can take the form of conveying the actual instruction sequences for the algorithm to be used between the vendor and the target device (e.g., the PLD). In one embodiment of this approach, the code implementing the session encryption algorithm is pushed from the vendor to the target device. In another embodiment of this approach, the code implementing the session encryption algorithm is pushed from the target device to the vendor.

Once the session key and session encryption algorithm have been communicated to the FPGA, the FPGA acknowledges receipt of this information. Vendor 1 then responds with an encrypted version of IP1 and a key corresponding thereto. These transactions allow the FPGA to receive IP1 and its key securely, and then decrypt IP1, in order to insert IP1 into the skeleton design. IP1 can also be validated at this point using a message digest or similar mechanism.

The FPGA also communicates with a second vendor, vendor 2. As in the case of vendor 1, the FPGA sends a "hello" message to vendor 2, and then sends its public key and a request for second and third IP cores (identified in FIG. 12 as IP2 and IP3, respectively). Vendor 2 acknowledges this information, and then provides information regarding an encryption key for the session and the decryption algorithm to be used. As before, the FPGA acknowledges receipt of this information. Upon receipt of this acknowledgement, vendor 2 provides an encrypted version of the second IP core (IP2) and a key therefor.

Vendor 2 also communicates the FPGA's request for IP3 to vendor 3. This communication can take place, for example, via a standard networking request using a secure protocol. Using this secure protocol, vendor 2 requests the third IP core (IP3) from vendor 3. In response, vendor 3 provides IP3 to vendor 2. Vendor 2, in turn, encrypts 11'3 and forwards IP3 to the FPGA along with a key therefore, using the session key and algorithm agreed upon previously. As with IP1, the FPGA decrypts IP2 and IP3 (using their respective keys), and inserts IP2 and IP3 into the skeleton design. IP2 and IP3 can also be validated at this point using a message digest or similar mechanism. At this point, the configuration of the FPGA is complete.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A computer implemented method comprising:
   configuring a target device with a trusted loader, wherein said target device comprises programmable circuits and said trusted loader comprises a network interface and a memory storing data enabling secure communications between the target device and an IP core vendor;
   downloading an encrypted IP core to said target device, wherein said encrypted IP core comprises a skeleton design comprising a gap to be filled by another IP core;
   generating a decrypted IP core by decrypting said encrypted IP core;
   downloading a vendor IP core, separate from said encrypted IP core, from an IP core vendor to said trusted loader, wherein said vendor IP core is intended to fill said gap;
   decrypting, by said trusted loader, said vendor IP core; and
   programming said decrypted vendor IP core into said programmable circuits of said target device within said skeleton design.

2. The method of claim 1, wherein
   said trusted loader is originated from a trusted framework agent.

3. The method of claim 2, further comprising:
   receiving a request for said vendor IP core from a requestor.

4. The method of claim 3, wherein
   said requestor is a programmable logic device.

5. The method of claim 3, further comprising:
   determining if said requestor is authorized to receive said vendor IP core.

6. The method of claim 3, further comprising:
verifying authenticity of said requestor.

7. The method of claim 3, further comprising:
determining if said requestor is authorized to receive said vendor IP core;
verifying authenticity of said requestor; and
performing said downloading only if said requestor is authentic and authorized to receive said vendor IP core.

8. The method of claim 7, wherein said verifying comprises:
attempting to decrypt encrypted information using a key; and
indicating an error if said attempting to decrypt said encrypted information fails.

9. The method of claim 8, wherein said verifying further comprises:
generating said encrypted information by encrypting information with a public key or private key of said requestor.

10. The method of claim 7, further comprising:
generating said encrypted IP core by encrypting a skeleton IP core prior to said downloading, wherein said encrypted IP core is downloaded to said target device.

11. The method of claim 10, wherein said generating said decrypted vendor IP core comprises:
generating said decrypted vendor IP core by performing said decrypting subsequent to said downloading.

12. The method of claim 11, further comprising:
validating said decrypted vendor IP core using a hash value received from said vendor.

13. The method of claim 11, further comprising:
causing said target device to program said decrypted vendor IP core into said skeleton design.

14. The method of claim 10, further comprising:
attempting to decode said encrypted IP core using a key; and
indicating an error if said attempting to decode said encrypted IP core fails.

15. A system comprising:
a trusted framework agent;
an integrated circuit device coupled to said trusted framework agent, said integrated circuit device having programmable circuits;
a skeleton design to be loaded into said programmable circuits;
a trusted loader received at said integrated circuit device from said trusted framework agent and implemented in said integrated circuit device, wherein
said trusted loader comprises a processor coupled to a trusted firmware storage unit configured to store trusted firmware, said trusted loader enabling said integrated circuit device to acquire an encrypted IP core, separate from said skeleton design, from an IP vendor, decrypt said encrypted IP core, and program said decrypted IP core into said skeleton design.

16. The system of claim 15, wherein said trusted loader further comprises:
a memory coupled to said processor and configured to store instructions for causing said processor to process said encrypted IP core.

17. The system of claim 16, wherein
said memory is further configured to store a decryption key.

18. The system of claim 15, wherein said trusted loader further comprises:
a network interface, wherein
said network interface is coupled to said processor and an internetwork, and
said network interface is configured to support communications between said processor and said internetwork; and
a non-volatile memory, coupled to said network interface and configured to store a decryption key.

19. The system of claim 15, wherein said integrated circuit device is a field-programmable gate array (FPGA), and further comprising:
an FPGA fabric; and
an internal configuration access port (ICAP), coupled between said processor and said FPGA fabric.

20. The system of claim 19, further comprising:
a secure configuration unit, coupled to said trusted loader and said FPGA fabric; and
a non-volatile memory, coupled to said secure configuration unit and configured to store a decryption key.

* * * * *